April 23, 1946.  A. J. HOLMAN  2,398,790
PRECISION CYLINDRICAL SURFACE GENERATING DEVICE
Filed June 4, 1942  3 Sheets-Sheet 1
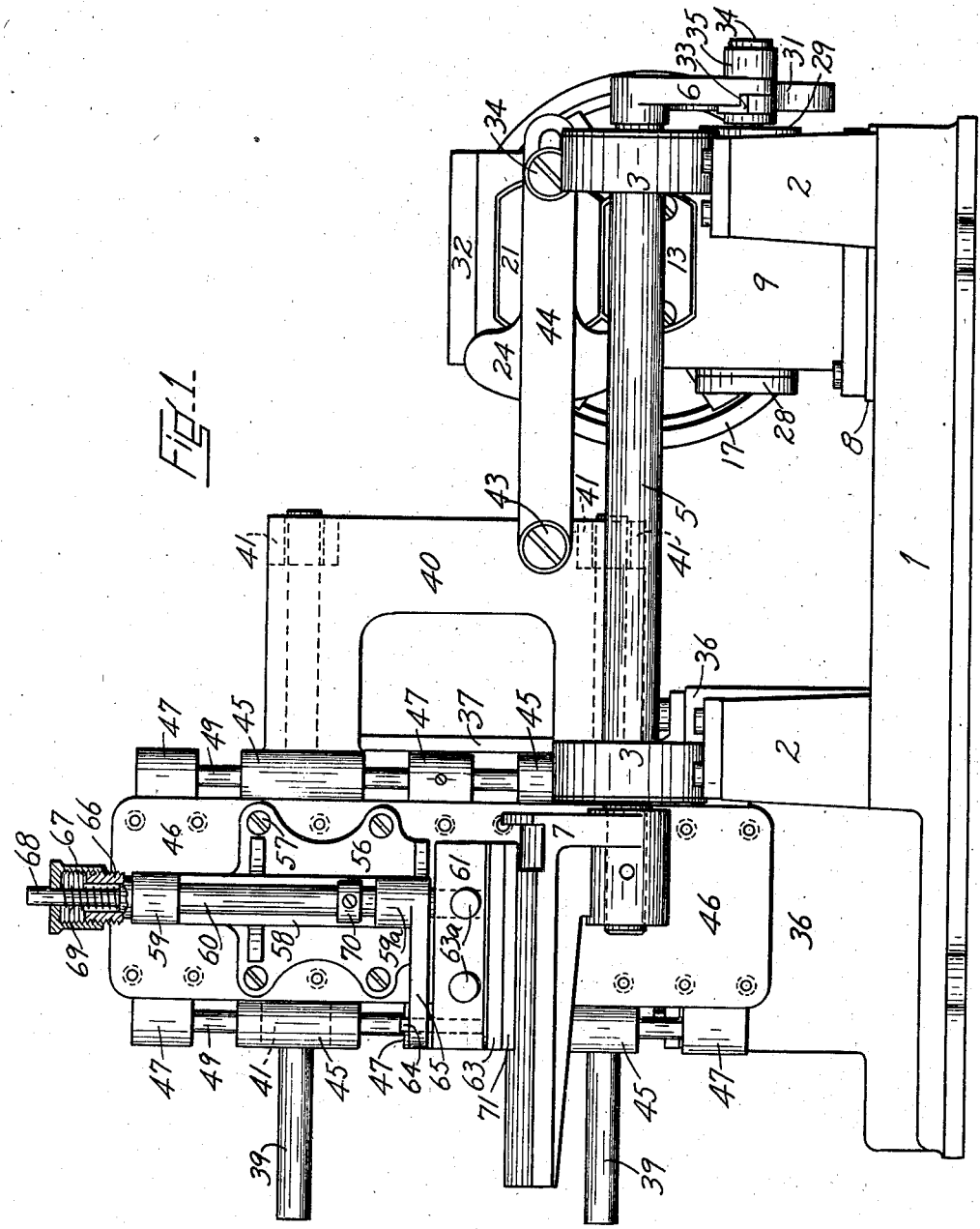
INVENTOR=
Arthur J. Holman.

April 23, 1946.　　A. J. HOLMAN　　2,398,790
PRECISION CYLINDRICAL SURFACE GENERATING DEVICE
Filed June 4, 1942　　3 Sheets-Sheet 2
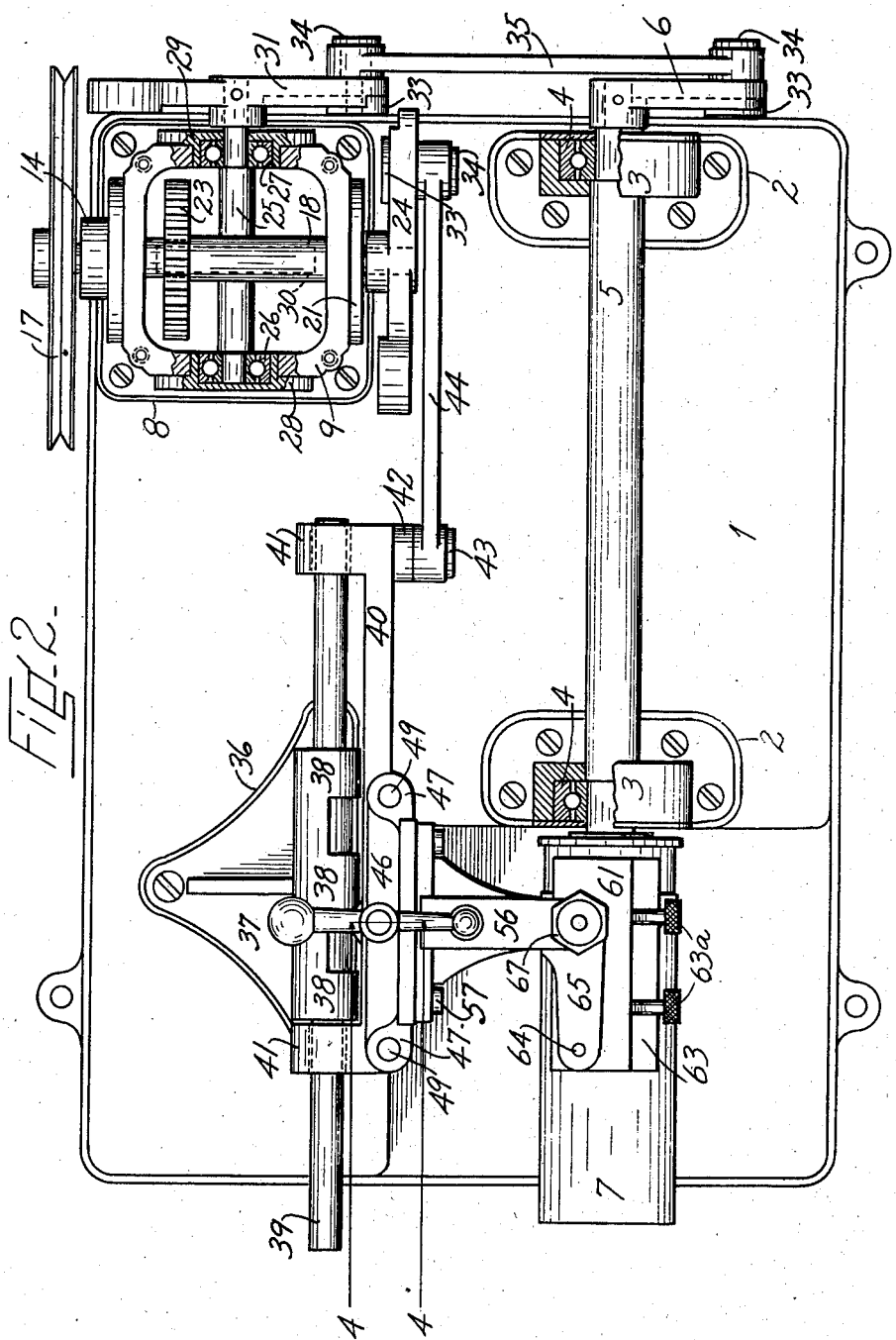
INVENTOR=
Arthur J. Holman.

April 23, 1946.   A. J. HOLMAN   2,398,790
PRECISION CYLINDRICAL SURFACE GENERATING DEVICE
Filed June 4, 1942   3 Sheets-Sheet 3
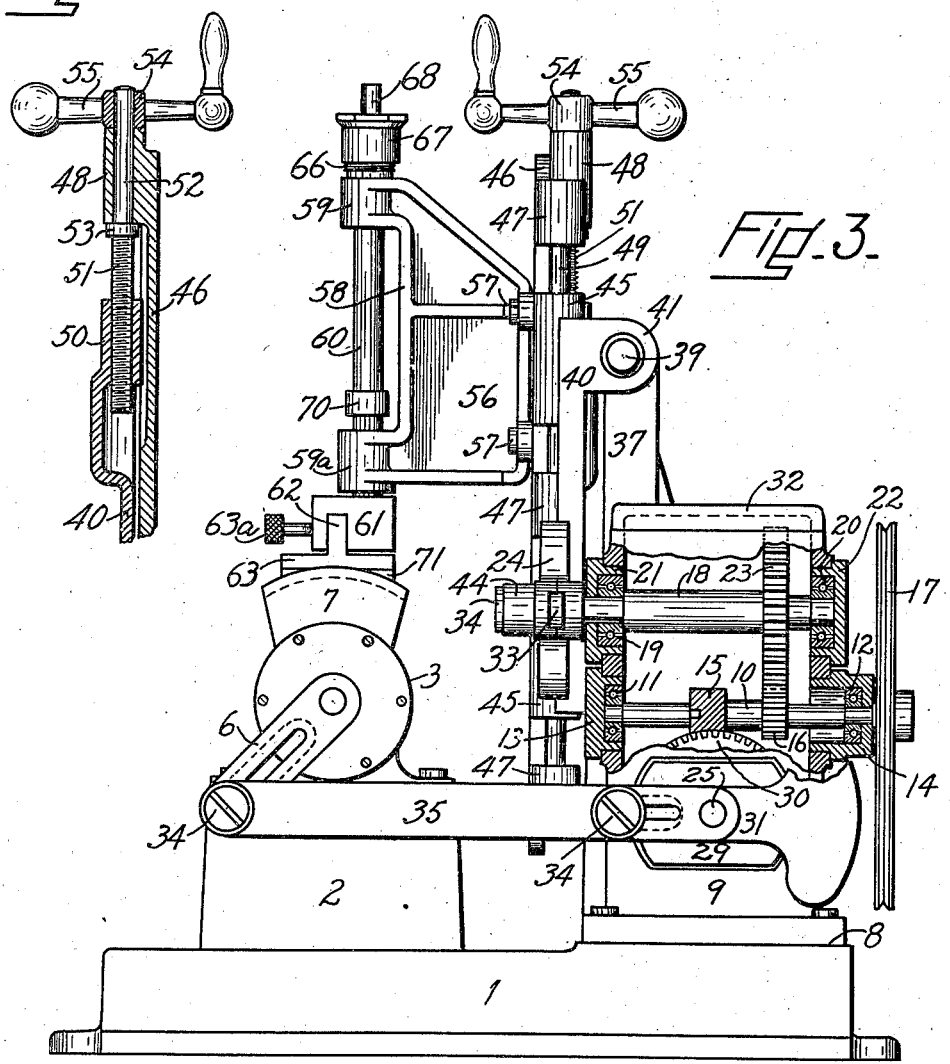
INVENTOR=
Arthur J. Holman.

Patented Apr. 23, 1946

2,398,790

UNITED STATES PATENT OFFICE 2,398,790

PRECISION CYLINDRICAL SURFACE
GENERATING DEVICE

Arthur J. Holman, Brighton, N. Y.

Application June 4, 1942, Serial No. 445,816

13 Claims. (Cl. 51—58)

My invention relates to apparatus for generating optical surfaces and it has been my special object, in this case, to provide mechanism for generating precision cylindrical surfaces such as are required for astigmatizers in range finders, in aviation drift sights and in other precision instruments for military purposes. Precision cylindrical surfaces are required also in certain exciter systems for sound pick-up units in motion picture projectors and the present apparatus is suited admirably to grinding and polishing such elements as are used for this purpose in my sound pick-up exciter systems disclosed in Letters Patent of the United States No. 2,036,275 dated April 7, 1936, and No. 2,151,700 dated March 28, 1939.

The process of generating any optically precise surface, whether it be a spherical surface, an optical flat or a cylindrical surface, requires, first of all, a mechanism wherein the movements of the work and the tool are rigidly controlled. The nature of the restraint imposed upon the movements of the work and tool is determined by the geometry of the surface to be generated. For example, a spherical surface will be generated automatically on both the work and tool if all movements are constrained to take place about' the center of curvature of the surface which is required to be generated. An optical flat will be generated automatically if the mechanism is designed to constrain all movements of the work and tool to take place about a center at infinity. A precision cylindrical surface will be generated if all movements of the work and tool are constrained to take place concentric with and parallel to the axis of the cylindrical surface it is desired to generate. I have proven, over and over again that, if the movements imposed upon the work and the tool by the structures of the mechanism are in strict conformity with the geometry of the surface, the mechanism will not only generate on the work the surface desired but it will also continuously regenerate the surface of the tool. The result is that the abrading surface of the tool never loses its shape as do the tools employed in conventional lens surfacing machines wherein the tool or the work is free-floating and the work takes its form, not primarily from the movements imposed upon the work and tool, but rather from the shape of the abrading surface of the tool. Since the abrading surface of the tool always retains its proper shape in surface generating mechanism, it follows naturally that piece after piece of work will have identical surfaces.

In a few words, the present process of generating optical surfaces takes the hit and miss out of lens surface production: it depends for accuracy of product on the mechanism rather than on the skill of the individual operator; it produces the surface progressively in the natural way and according to the geometry of the surface, hence it is extremely fast both in grinding and in polishing, the product is uniform in quality and the machine requires very litle skill on the part of the operator. In fact, any intelligent individual of either sex can be trained in a few hours to operate such mechanisms satisfactorily.

My present invention represents a distinct improvement over the apparatus for grinding and polishing cylindrical lenses disclosed in my Letters Patent of the United States No. 2,020,312 which was issued on November 12, 1935. In this earlier invention, which is not a surface generator, the chuck carrying the work is fed toward the tool by structures including a pair of parallel hinge joints which are at right angles to the axis of oscillation of the cylindrical tool (see Fig. 5 of Patent No. 2,020,312). These structures retain the work in contact with the tool under pressure, but, because of the hinge action, rocking of the work and chuck can occur about the axis of the supporting hinge pins as the work, in reciprocating, moves across and follows the contour of the surface of the tool. In using this device, the ends of the tool wear more rapidly than does its center, hence the work and chuck are bound to rock about the hinge axis as the surface of the work follows the contour of the tool and, consequently, the tool wears still more rapidly at the ends and its abrading surface soon becomes toric in form. Quite naturally, the lens surface also becomes toric, and each succeeding lens ground on the tool departs more and more from the true cylindrical form. To overcome this difficulty, my present device is provided with work feeding means which does not permit the work to rock about an axis at right angles to the axis of oscillation of the tool. Any suitable work feeding structure which will feed the work along a straight line and radially toward the axis of the tool and also prevent tipping and tilting of the work and chuck as grinding and polishing progresses, will serve the desired purpose, namely, successive positions of the work, as grinding and polishing progresses, must be and remain parallel to the initial position of the work when grinding first started. Such a work feeding device prevents the tool from wearing more rapidly at its ends and hence prevents it from assuming a toric form; consequently, my present device produces precision cylinders in quantities without reforming the tool in a lathe or other machine.

My device may be best understood by reference to the accompanying drawings in which Fig. 1 is a front view, Fig. 2 is a top view with gear box cover removed.

Fig. 3 is an end view with gear box broken away to show gearing and shafts,

Fig. 4 is a partial section on line 4—4 of Fig. 2 showing work feeding carriage operating means, Fig. 5 is an end view of chuck and work mounted thereon.

Referring now more specifically to the drawings in which like reference numerals indicate like parts, 1 is a cast metal base (Figs. 1, 2 and 3) having a pair of integral bosses 2 machined on their top surfaces to seat ball bearing supporting brackets 3 wherein ball bearings 4 are lightly press fitted. The oscillating shaft 5 is provided with seats whereon ball bearings 4 are lightly press fitted. On one end of shaft 5 which projects through one ball bearing 4 is fitted adjustable crank 6 which is pinned to shaft 5 to prevent rotation thereon. The other end of shaft 5 projecting through the other ball bearing 4 is turned and ground to form a seat for the tool 7. Ball bearings 4 are of the highest grade obtainable and their fit in the supporting brackets and on shaft 5 and their alignment must be such as to insure the most accurate movement of the surface of the tool 7 about the axis of oscillating shaft 5.

The base 1 is provided with a third integral boss 8 (Fig. 3) machined on top to provide a seat for the gear box 9 which is held on base 1 by suitable screws. Main drive shaft 10 is journaled in ball bearings 11 and 12, supported in bearing retainers 13 and 14 respectively, which are suitably held by screws within bores in bosses on opposite sides of gear box 9. Drive shaft 10 carries press fitted thereon and within gear box 9 the helical gear 15 and the spur gear 16 and it has fast mounted on its outboard end the pulley 17 by which power is applied to operate the mechanism. A crank shaft 18 running through the upper part of gear box 9 in a direction parallel to drive shaft 10 is journaled in ball bearings 19 and 20, supported in bearing retainers 21 and 22 respectively, which are suitably held by screws within bores in bosses on opposite sides of gear box 9. A spur gear 23 press fitted on crank shaft 18 meshes with spur gear 16 on drive shaft 10 and is driven thereby. An adjustable counterbalanced crank 24 is fitted to and pinned on the end of crank shaft 18 which projects through bearing retainer 21. A second crank shaft 25 (Fig. 2) running through the lower part of gear box 9 in a direction at right angles to drive shaft 10 is journaled in ball bearings 26 and 27, supported in bearing retainers 28 and 29 respectively, which are suitably held by screws within bores in bosses on opposite sides of gear box 9. A helical gear 30 press fitted on crank shaft 25 meshes with helical gear 15 on drive shaft 10 and is driven thereby. A second adjustable counterbalanced crank 31 is fitted to and pinned on the end of crank shaft 25 which projects through bearing retainer 29. Gear box 9 is closed at the top by cover plate 32 (Fig. 3) which is held in place by screws. Gear box 9 is partially filled with oil to lubricate automatically all the bearings and the gears of the crank drive mechanism.

The adjustable cranks 6, 24 and 31 (Figs. 2 and 3) are slotted on one side to receive a nut 33 which has flat sides to slide in the slot and thus prevent turning when the crank pin screw 34 is loosened and retightened for the purpose of changing the throw of the crank. The cranks are, of course, slotted also to allow passage therethrough of the threaded portions of the crank pins at all positions within the range of adjustability of the crank throw. Connecting crank pin 34 on crank 31, with crank pin 34 on crank 6, is the connecting rod 35 through which power is applied to rock the oscillating shaft 5.

A forth integral boss 36 (Figs. 1 and 2) on base 1 is machined on its top surface to seat carriage supporting bracket 37 which is secured to base 1 by suitable screws. Two groups of bosses 38, one group at the top of carriage supporting bracket 37 and the other near the bottom thereof, are bored so the axes of these bores are parallel to each other and also parallel to the axis of oscillating shaft 5, and within these bores are secured by set screws the rods 39. The sliding carriage 40 has four integral bosses 41 projecting from its rear surface and these are bored and bushed with anti-friction bushings which are press fitted in bosses 41 and arranged to slide freely but with minimum clearance on the rods 39 fixed in carriage supporting bracket 37. A boss 42 on the front of sliding carriage 40 is tapped to receive connecting rod screw 43 which passes through one end of connecting rod 44, the other end of which is atttached to adjustable crank 24 by the crank pin screw 34. In this manner power is applied to move sliding carriage 40 back and forth on rods 39 which are fixed in carriage supporting bracket 37. It is to be noted here that sliding carriage 40 is constrained to move only in the direction parallel to the axis of oscillating shaft 5.

Two pairs of integral bosses 45 (Fig. 1) on the front face of sliding carriage 40 contain parallel bores standing exactly at right angles to the axes of the bushed bores 41 which slide on the rods 39. An adjustable work feeding carriage 46 having three pairs of integral bosses 47 projecting outwardly and backwardly from its top, bottom and midsection, also carries projecting from its top center integral boss 48. The three pairs of bosses 47 contain parallel bores in exact alignment with the parallel bores in bosses 45 on sliding carriage 40, and through bosses 45 and 47 are inserted the rods 49. These are fixed in work feeding carriage 46 by set screws in the central pair of bosses 47 and slide with slight clearance through the bores in bosses 45. A threaded bore in a boss 50 (Fig. 4) on sliding carriage 40 in alignment with the bore in boss 48 on adjustable work feeding carriage 46 fits the threaded portion 51 of feed screw 52 the body of which is a free turning fit in the bore in boss 48. An integral collar 53 on feed screw 52 contacts against the lower finished end of boss 48, and the hub 54 of feed screw handle 55, which is pinned to feed screw 52, bears against the upper finished end of boss 48. By turning feed screw handle 55 the work feeding carriage 46 may be raised or lowered on the sliding carriage 40 without tipping or tilting of the work feeding carriage with respect to the axis of oscillating shaft 5.

The chuck holder stem supporting bracket 56 (Fig. 1) has a flat machined surface which fits against the front surface of adjustable work feeding carriage 46 and may be secured in positions at various elevations thereon by the four screws 57 which are a close fit through the holes in chuck holder stem supporting bracket 56 and which may be screwed into any four of the equally spaced tapped holes in the face of the work feeding carriage. A web 58 on chuck holder stem supporting bracket 56 has integral bosses 59 and 59a bored to receive chuck holder stem 60 which is fitted well therein to slide freely without lost motion. On the lower end of stem 60 is press fitted the steel oblong faced chuck holder 61 which is accurately slotted throughout its length to receive with slight clearance the projecting tongue 62 (Fig. 5) of the steel chuck 63, the latter being retained in position on the chuck holder by suitable brass thumb screws 63a. Chuck 63 (Fig. 2) is proportioned so its work mounting face will accommodate multiple astigmatizer blanks. As shown, the chuck 63 is twice as long as it is wide, to take two astigmatizers, and it is supported in oblong faced chuck holder 61 throughout its entire length. A guide pin 64 (Fig. 1) press fitted into the top of chuck holder 61 near one end, stands parallel to chuck holder stem 60 and projects with slight clearance through a hole in lug 65 which projects horizontally from boss 59a in the direction parallel to the face of work feeding carriage 46. The alignment and position of chuck holder 61 are such that the vertical plane containing the axis of oscillating shaft 5, also the axis of cylindrical tool 7, passes lengthwise through the slot in the chuck holder and bisects from end to end tongue 62 on chuck 63, the work supporting face of which is maintained always parallel to the axis of cylindrical tool 7 and at right angles to said vertical plane. Boss 59 on chuck holder stem supporting bracket 56 has an upwardly projecting threaded portion 66 whereon is screwed the hollow threaded spring tension adjusting cap 67. The stem 60 has an end portion 68 of reduced diameter at its upper end around which is fitted compression spring 69, the latter abutting at its lower end against the shoulder on stem 60 and at its upper end against the inside of spring tension adjusting cap 67. Adjusting cap 67 is bored for clearance fit over end portion 68 of stem 60. An adjustable collar 70 fastened on stem 60 by a brass set screw limits the movement downwardly of the chuck holder stem in chuck holder stem supporting bracket 56. The work 71 which is to be ground and polished, is centered and aligned on the lower surface of chuck 63 and is secured thereto by mounting pitch or other suitable means.

It is to be noted that oblong faced chuck holder 61 is so aligned that the slot running lengthwise thereof is exactly parallel to the axis of oscillating shaft 5. Moreover, chuck 63 is so made that tongue 62 thereon is exactly centered with respect to the face whereon the work 71 is mounted. Tongue 62 stands parallel to the long edges of chuck 63, and its height is slightly greater than the depth of the slot in chuck holder 61 wherein it fits. The cylindrical surface generated on the work will have its axis parallel to tongue 62, parallel to the long edges of the chuck and also parallel to the face of the chuck whereon the work has been mounted. It follows, therefore that, if the work has been carefully centered and aligned on the chuck and if the mounting pitch between the work and chuck is of uniform thickness, the cylindrical surface generated on the work will be centered on and the square to the work.

The description of my device thus far has dealt with the mechanism as set up with a convex tool and organized to generate concave surfaces on the work. A convex surface may be generated by using a tool having a concave surface which is operated below the axis of oscillating shaft 5. In generating convex cylindrical work surfaces the chuck holder stem supporting bracket 56 is attached to the face of work feeding carriage 46 at a position lower down than illustrated in the drawings and the surface of the work to be ground and polished is generated at some level below the axis of oscillating shaft 5, the exact level being determined, of course, by the radius of curvature of the surface required. The procedure to be followed in grinding and polishing convex work surfaces is, in all other respects, the same as that followed in finishing concave work surfaces.

Convex surfaces may be generated, with the mechanism set up substantially as described for generating concave surfaces, by substituting a work mounting chuck for the convex tool on the oscillating member and a concave tool in place of the work mounting chuck on the reciprocating chuck holder. With this set up, however, an adjustable stop 70 should be so set as to prevent the tool from feeding radially toward the work, as grinding progresses, beyond the position at which the distance from the tool to the axis of the oscillating shaft is equal to the radius of curvature which has been generated previously on the abrading surface of the tool.

In the process of generating optical flats and precision spherical surfaces, the geometry of the surface permits both oscillation and rotation of the tool and work, but in generating precision cylindrical surfaces the movements of work and tool are limited to oscillation about the axis of the cylindrical surface being generated and to longitudinal motion in the direction parallel to this axis. In the present device, the tool is rocked (oscillated) about the axis of its cylindrical surface and the work is moved back and forth over the surface of the tool in the direction parallel to the axis thereof. In any surface generating device it is essential that the motion performed by one part (tool) must not be influenced by the motion performed by the other (work support), and vice versa. For this reason it is most important that the position of the axis of oscillation of the tool be secured so solidly that slider motion of the work carriage along this axis shall have no influence upon it. In like manner, the work supporting slider mechanism must be so designed and constructed that the work carriage, and the work carried thereby, will perform reciprocating motion along a straight path parallel to the axis of oscillation of the tool and the cross-motion of the tool, as the tool oscillates upon its axis, shall have no influence whatsoever upon the reciprocating motion of the work carriage and the work carried thereby. Except for slight distortion, due to the angularity of the connecting rods, the relative movements of the work and the tool are simple harmonic motions combined at right angles.

It is recognized that the combining of simple harmonic motions, of slightly different frequencies, at right angles, will provide a constantly shifting phase angle between the component motions and this is productive of great variety in the resultant motion pattern. In the present case, wherein rotation of the work and tool are both prohibited by the geometry of the surface, it is especially important to make the phase angle shift per crank cycle as small as possible so the complete motion pattern will occupy many crank cycles. If the gear ratios were such that crank shafts 18 and 25 differed in rotative speeds by one in ten revolutions, the resultant motion pattern would be completed when one crank had made ten revolutions and this would be a short cycle. A motion pattern cycle completed in one hundred revolutions of a crank would be much more satisfactory and a cycle requiring several hundred crank turns for completion would be excellent for generating precision cylindrical surfaces. This is an important factor in the design and organization of my present device.

The operation of my device is as follows: Pulley 17 is turned slowly by hand until crank 6 on oscillating shaft 5 stands vertically. Tool 7 is then adjusted on its seat on shaft 5 until the radius connecting its axis to the mid point on its cylindrical surface also stands vertically. The tool is then locked in this position on shaft 5 by tightening the brass set screws. Chuck holder stem supporting bracket 56 is secured to work feeding carriage 46 in such vertical position as to permit insertion of the chuck 63 and the work carried thereon into the chuck holder and also to permit feeding of the work toward the tool by lowering the work feeding carriage on the sliding carriage 40. As hereinbefore stated, the work 69 has already been secured to the lower face of the chuck. After the slot in chuck holder 61 and the tongue 62 on the chuck 63 have been thoroughly cleaned, the chuck is inserted in the chuck holder where it is secured by tightening thumb screws 63a.

The abrading surface of the tool 7 is coated with abrading material, using a brush for the purpose, and work feeding carriage 46 is lowered by turning feed screw handle 55 until guide pin 64 projects above lug 65 about as illustrated in Fig. 1. Spring tension adjusting cap 67 is then screwed up or down till the desired pressure of the work on the tool is secured. More or less pressure, beyond the range of spring 69, may be secured by inserting a stronger or a weaker spring in place of spring 69. For a given spring and a given setting of adjusting cap 67, the pressure between the work and tool may be varied somewhat by allowing more or less of guide pin 64 to project above lug 65 when lowering the work feeding carriage by operating feed screw handle 55.

Driving power is applied through pulley 17 and the mechanism is operated till the abrading material on the tool has been used up. The power is shut off, however, before the surface of the tool shows signs of becoming dry. The work is withdrawn from the tool by operating feed screw handle 55 until there is sufficient clearance between work and tool to permit washing and recoating the tool with fresh abrading material. The work is again applied to the tool under pressure as before and the operations are repeated. When sufficient grinding has been done to bring in the entire surface of the work, the chuck may be removed from its holder so the work may be washed and examined critically with a loupe. If the surface is found to be ground uniformly all over, the tool is washed carefully and grinding operations are repeated with a finer abrading material. After the last fine grinding, the grinding tool is removed and replaced with a polishing tool having a pitch or bees wax surface. The work, after being carefully cleaned, is applied to the polishing tool, rouge is added, and polishing follows the same routine as previously described for grinding.

In any mechanism capable of generating a cylindrical surface it will be readily apparent that any tool not having a cylindrical surface cannot possibly generate a cylindrical surface on a piece of work until the tool itself has become cylindrical in form. Moreover, even if the tool has a cylindrical surface, it cannot possibly generate a cylindrical surface on a piece of work unless (or until) the axis of the cylindrical surface on the tool has become coincident with the fixed axis about which the surface of the tool is being oscillated. When changing over the machine from grinding to polishing it is highly important that the surface of the polishing tool be formed to the exact shape and radius of curvature as the surface on the tool whereon the work was fine ground. For example, if a convex polisher is too small in diameter it will polish only the middle section of a concave surface; if the polisher is too large in diameter it will not polish the middle of a concave surface at all. In either event, the polisher will tend to generate on the work a new cylindrical surface of like radius of curvature to its own.

The structures herein described meet all requirements for generating a precision cylindrical surface, but other structures, which may perform equally well, will become obvious to those skilled in the art. The appended claims are drawn broadly enough to cover any and all mechanisms wherein the movements of work and tool are constrained, as hereinbefore stated, to meet the conditions for surface generation imposed by the geometry of a cylindrical surface, and the claims are intended to be so interpreted.

Having thus fully described my device, what I claim is:

1. In a device for generating cylindrical surfaces a crank driven oscillating member hingedly mounted and arranged to oscillate about a fixed axis, a cylindrical abrading tool mounted on said oscillating member with its axis coinciding with said fixed axis, a crank driven carriage member slidably mounted and adapted and arranged to reciprocate along a straight path parallel to said fixed axis, a work feeding carriage mounted on said carriage member, means for guiding and means for adjusting said work feeding carriage so that it may be variously positioned along a straight path at right angles to said first mentioned straight path, a chuck holder stem supporting bracket fixed on said work feeding carriage, a chuck holder stem slidably mounted in said supporting bracket, a chuck holder fixed on said stem, means for keeping said chuck holder parallel to the path of travel of said crank driven carriage member, and yielding means for applying pressure on said chuck holder.

2. Operating mechanism for cylindrical surface generator, comprising a cylindrical tool supporting shaft constrained to oscillate rotatively on its own axis, a rotatable drive shaft positioned parallel to said tool supporting shaft, cranks and a connecting rod operatively connecting said shafts, a second rotatable drive shaft disposed at right angles to said first mentioned drive shaft, a work supporting carriage slidably mounted and constrained to reciprocate along a straight path parallel to the axis of said cylindrical tool supporting shaft, said work supporting carriage carrying slidably supported thereon a work feeding carriage adapted and arranged to move under manual control at right angles to the axis of said cylindrical tool supporting shaft and without tipping or tilting with respect to said axis, a crank and connecting rod operatively connecting said second rotatable drive shaft with said work supporting carriage, a common drive shaft, gears operatively connecting said rotatable drive shafts with said common drive shaft, said gears being specially designed as to ratios to provide a slight phase shift per stroke between the oscillation of said tool supporting shaft and the reciprocation of said work supporting carriage, and a gear box wherein said drive shafts are journaled and said gears are enclosed.

3. A cylindrical surface generating device, comprising a base, an oscillating member hingedly supported from said base so its movement is restricted to rocking about a fixed axis, a slidably mounted carriage member supported from said base so its movement is restricted to reciprocation along a straight path parallel to said fixed axis, means for actuating these movable members so each may perform its restricted movement uninfluenced by the motion of the other, a tool having an abrading surface of cylindrical form, a chuck whereon work may be mounted, said tool being mounted on said oscillating member and said chuck being mounted on said carriage member, and means adjustably mounted on said carriage member for presenting and feeding automatically said work toward said tool in a direction at right angles to, and radially toward, said fixed axis, said means adjustably mounted on said carriage member being adapted and arranged to constrain said work to remain parallel to said fixed axis at all times during grinding and polishing.

4. A cylindrical surface generating device, comprising a base, a member hingedly supported from said base and constrained to oscillate about a fixed axis, a carriage member slidably supported from said base and constrained to reciprocate along a straight path parallel to said fixed axis, means for actuating these movable members so each may perform its restricted movement uninfluenced by the motion of the other, a tool having a cylindrical abrading surface, means for mounting said tool on said first mentioned member so the axis of said cylindrical abrading surface coincides with said fixed axis, a chuck whereon work may be mounted, a work feeding carriage, means for supporting said chuck on said work feeding carriage, and slider means connecting said work feeding carriage with said carriage member for presenting and feeding, both manually and automatically, said chuck and the work mounted thereon toward said tool in a direction at right angles to, and radially toward, said fixed axis, said slider means being adapted and arranged to keep said work always parallel to said fixed axis as said work is fed toward said tool.

5. A cylindrical surface generating device, comprising a base, a member hingedly supported from said base and constrained to oscillate about a fixed axis, a carriage member slidably supported from said base and constrained to reciprocate along a straight path parallel to said fixed axis, means for actuating these movable members so each may perform its restricted movement uninfluenced by the motion of the other, a tool having a cylindrical abrading surface, means for mounting said tool on said first mentioned member so the axis of said cylindrical abrading surface coincides with said fixed axis, a chuck whereon work may be mounted, a work feeding carriage adjustably mounted on said carriage member, manually operated means to move said work feeding carriage at right angles to the path of travel of said carriage member and toward and away from said fixed axis, a chuck holder adjustably mounted on said work feeding carriage, and resilient means for forcing said chuck holder and said chuck radially toward said fixed axis, said work feeding carriage adjustably mounted and said chuck holder adjustably mounted being adapted and arranged to constrain the work mounting face of said chuck to remain parallel to said fixed axis at all times during grinding and polishing.

6. In a cylindrical surface generating device, a hingedly mounted oscillating member restricted in its movement to rocking about a fixed axis, a cylindrical abrading tool mounted on said oscillating member, a slidably mounted carriage member restricted to reciprocation along a straight path parallel to said fixed axis, a work feeding carriage adjustably mounted on and arranged to reciprocate with said carriage member, work chucking means, guide means connecting said work chucking means with said work feeding carriage, and spring means to advance said work chucking means radially toward said fixed axis under yielding pressure as grinding and/or polishing progresses, said guide means being adapted and arranged to constrain said work chucking means to remain always parallel to said fixed axis.

7. In a cylindrical surface generating device, a hingedly mounted oscillating member restricted in its movement to rocking about a fixed axis, a cylindrical abrading tool mounted on said oscillating member, a slidably mounted carriage member restricted to reciprocation along a straight path parallel to said fixed axis, a work feeding carriage adjustably mounted on and arranged to ciprocate with said carriage member, and work chucking means slidably mounted on said work feeding carriage so it may move thereon in either direction along a straight line without tipping or tilting, manually operated means associated with said carriage member and said work feeding carriage to move said work feeding carriage without tipping or tilting along a straight path at right angles to the path of reciprocation of said carriage member, and means on said work feeding carriage to advance automatically said work chucking means radially toward said fixed axis under yielding pressure as grinding and polishing progresses.

8. In a cylindrical surface generating device, a hingedly mounted oscillating member restricted in its movement to rocking about a fixed axis, a cylindrical abrading tool mounted on said oscillating member, a slidably mounted carriage member restricted to reciprocation along a straight path parallel to said fixed axis, a work feeding carriage slidably mounted on and arranged to reciprocate with said carriage member, and work chucking means slidably mounted on said work feeding carriage comprising a chuck holder, an oblong faced chuck whereon multiple work pieces may be mounted, and clamping means permitting quick removal of said chuck from said chuck holder and subsequent exact replacement thereof in said chuck holder so the long edges of said oblong faced chuck will be parallel to, and centered over, said fixed axis, said work feeding carriage slidably mounted and said work chucking means slidably mounted being adapted and arranged to constrain said oblong faced chuck to remain parallel to said fixed axis during grinding and polishing.

9. In a cylindrical surface generating device, a hingedly mounted oscillating member restricted in its movement to rocking about a fixed axis, a cylindrical abrading tool mounted on said oscillating member, a slidably mounted carriage member restricted to reciprocation along a straight path parallel to said fixed axis, a work feeding carriage arranged to reciprocate with said carriage member, and a work chucking means on said work feeding carriage comprising a chuck holder, an oblong faced chuck whereon multiple work pieces may be mounted, and clamping means including a parallel sided slot in the body of said chuck holder running parallel to said fixed axis, a centrally positioned tongue on said chuck having parallel faces running lengthwise of said oblong faced chuck and spaced to fit with small clearance within said parallel sided slot, and means for retaining one face of said tongue against one side of said slot.

10. In a cylindrical surface generating device, a hingedly mounted oscillating member, a cylindrical abrading tool mounted on said oscillating member, a slidably mounted carriage member restricted to reciprocation along a straight path, a work feeding carriage adjustably mounted on and arranged to reciprocate with said carriage member, and work chucking means adjustably supported on said work feeding carriage, said work chucking means comprising a chuck holder, an oblong faced chuck whereon multiple work pieces may be mounted, and clamping means including a parallel sided slot in the body of said chuck holder running lengthwise thereof, symmetrically positioned parallel faces running lengthwise of said oblong faced chuck and spaced to fit with small clearance within said parallel sided slot, and locking means for retaining one of said parallel faces on said chuck against one side of said slot and the top of said chuck against the bottom of said slot for the purpose of aligning and centering said chuck porperly in said cylindrical surface generating device.

11. A cylindrical surface generating device, comprising a base, a member hingedly supported from said base and constrained to oscillate about a fixed axis, a carriage member slidably supported from said base and constrained to reciprocate along a straight path parallel to said fixed axis, means for actuating these movable members so each may perform its restricted movement uninfluenced by the motion of the other, a tool having a cylindrical abrading surface, means for mounting said tool on said first mentioned member so the axis of said cylindrical abrading surface coincides with said fixed axis, a work feeding carriage adjustably mounted on and arranged to reciprocate with said carriage member, work chucking means slidably mounted on said work feeding carriage so it may move thereon in either direction along a straight line, and manually and spring actuated means associated with said carriage member and said work feeding carriage and said work chucking means to advance said work chucking means without tilting or tipping radially toward said fixed axis under yielding pressure as grinding and/or polishing progresses.

12. A cylindrical surface generating device, comprising a base, a member hingedly supported from said base and constrained to oscillate about a fixed axis, a carriage member slidably supported from said base and constrained to reciprocate along a straight path parallel to said fixed axis, means for actuating these movable members so each may perform its restricted movement uninfluenced by the motion of the other, a tool having a cylindrical abrading surface, means for mounting said tool on said first mentioned member so the axis of said cylindrical abrading surface coincides with said fixed axis, a work feeding carriage adjustably mounted on and arranged to reciprocate with said carriage member, work chucking means slidably mounted on said work feeding carriage so it may move thereon in either direction along a straight line, manually operated means to move said work feeding carriage without tipping or tilting along a straight path at right angles to the path of reciprocation of said carriage member, and means on said work feeding carriage to advance automatically said work chucking means radially toward said fixed axis under yielding pressure as grinding and/or polishing progresses.

13. A cylindrical surface generating device, comprising a base, a member hingedly supported from said base and constrained to oscillate about a fixed axis, a carriage member slidably supported from said base and constrained to reciprocate along a straight path parallel to said fixed axis, means for actuating these movable members so each may perform its restricted movement uninfluenced by the motion of the other, a tool having a cylindrical abrading surface, means for mounting said tool on said first mentioned member so the axis of said cylindrical abrading surface coincides with said fixed axis, a work feeding carriage adjustably mounted on and arranged to reciprocate with said carriage member, work chucking means adjustably mounted on said work feeding carriage, and means associated with said carriage member and said work feeding carriage to advance said work chucking means without tipping or tilting radially toward said fixed axis under yielding pressure as grinding and/or polishing progresses, said work chucking means comprising a chuck holder, an oblong faced chuck whereon multiple work pieces may be mounted, and clamping means to permit quick removal and subsequent replacement of said chuck so the long edges of said oblong faced chuck will be parallel to and centered over said fixed axis.

ARTHUR J. HOLMAN.